US012398656B1

(12) United States Patent
Tomes

(10) Patent No.: US 12,398,656 B1
(45) Date of Patent: Aug. 26, 2025

(54) CONTAINMENT RING FOR GAS TURBINE ENGINE

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/652,686

(22) Filed: May 1, 2024

(51) Int. Cl.
*F01D 21/04* (2006.01)
*F01D 25/24* (2006.01)

(52) U.S. Cl.
CPC ......... *F01D 21/045* (2013.01); *F01D 25/243* (2013.01); *F05D 2240/14* (2013.01); *F05D 2250/283* (2013.01); *F05D 2260/311* (2013.01); *F05D 2300/612* (2013.01)

(58) Field of Classification Search
CPC ...... F04D 29/526; F04D 29/52; F04D 29/023; F04D 29/40; F01D 21/045; F01D 25/24; F01D 11/22; F01D 11/12; F01D 11/125; F01D 11/127; F05D 2240/14
See application file for complete search history.

(56) References Cited

U.S. PATENT DOCUMENTS

| | | | | |
|---|---|---|---|---|
| 5,437,538 | A * | 8/1995 | Mitchell | F01D 21/045 428/105 |
| 5,823,739 | A | 10/1998 | Van Duyn | |
| 6,227,794 | B1 | 5/2001 | Wojtyczka et al. | |
| 6,575,694 | B1 | 6/2003 | Thompson et al. | |
| 2011/0052383 | A1 * | 3/2011 | Lussier | F01D 21/045 156/190 |
| 2012/0224958 | A1 * | 9/2012 | Reed | F01D 25/243 415/213.1 |
| 2015/0308290 | A1 * | 10/2015 | Kappes | F01D 11/122 415/200 |
| 2018/0195527 | A1 * | 7/2018 | Kray | F02C 7/04 |
| 2021/0246807 | A1 * | 8/2021 | Caulfeild | F01D 11/127 |

* cited by examiner

*Primary Examiner* — Nathaniel E Wiehe
*Assistant Examiner* — Maxime M Adjagbe
(74) *Attorney, Agent, or Firm* — CANTOR COLBURN LLP

(57) ABSTRACT

A casing for a gas turbine engine, including: at least one axial hairpin feature located proximate to either a forward flange or a rearward flange; and a central connecting portion extending from the at least one axial hairpin feature, the at least one axial hairpin feature being located between the central connecting portion and one of the forward flange or a rearward flange.

20 Claims, 4 Drawing Sheets

CONTAINMENT RING FOR GAS TURBINE ENGINE

BACKGROUND

This disclosure relates to gas turbine engines, and more particularly to a containment ring for a gas turbine engine.

Gas turbine engines include rotating blades. In the event of a failure of any of the rotating blades it is desirable to contain the dislodged blade within the engine.

As such, it is desirable to provide an apparatus and method for blade containment in a gas turbine engine.

BRIEF DESCRIPTION

Disclosed is a casing for a gas turbine engine, including: at least one axial hairpin feature located proximate to either a forward flange or a rearward flange; and a central connecting portion extending from the at least one axial hairpin feature, the at least one axial hairpin feature being located between the central connecting portion and one of the forward flange or a rearward flange.

In addition to one or more of the features described above, or as an alternative to any of the foregoing embodiments, the at least one axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the at least one axial hairpin feature.

In addition to one or more of the features described above, or as an alternative to any of the foregoing embodiments, the first radially extending wall portion, the second radially extending wall portion and the axially extending portion of the at least one axial hairpin feature is formed from a ductile metal.

In addition to one or more of the features described above, or as an alternative to any of the foregoing embodiments, the cavity of the at least one axial hairpin feature is filled with a potting material.

In addition to one or more of the features described above, or as an alternative to any of the foregoing embodiments, the at least one axial hairpin feature is a first axial hairpin feature and a second axial hairpin feature, the first axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the at least one axial hairpin feature; and the second axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the second axial hairpin feature, and the second radially extending wall portion of the first axial hairpin feature is connected to the first radially extending wall portion of the second axial hairpin feature by the central connecting portion.

In addition to one or more of the features described above, or as an alternative to any of the foregoing embodiments, the cavity of the first axial hairpin feature and the cavity of the second axial hairpin feature is filled with a potting material.

In addition to one or more of the features described above, or as an alternative to any of the foregoing embodiments, the potting material extends along the connecting portion.

In addition to one or more of the features described above, or as an alternative to any of the foregoing embodiments, the central connecting portion varies radially as it extends from the at least one axial hairpin feature.

In addition to one or more of the features described above, or as an alternative to any of the foregoing embodiments, the first radially extending wall portion of the at least one axial hairpin feature is connected to either the forward flange or the rearward flange by a connecting portion which extends axially while the forward flange or the rearward flange extends radially therefrom.

In addition to one or more of the features described above, or as an alternative to any of the foregoing embodiments, the casing is a fan casing.

In addition to one or more of the features described above, or as an alternative to any of the foregoing embodiments, the first radially extending wall portion and the second radially extending wall portion of the at least one axial hairpin feature are secured together by frangible fasteners.

Also disclosed is a gas turbine engine, including: a fan having a plurality of fan blades; a casing surrounding the plurality of fan blades, the casing including: at least one axial hairpin feature located proximate to either a forward flange or a rearward flange; and a central connecting portion extending from the at least one axial hairpin feature, the at least one axial hairpin feature being located between the central connecting portion and one of the forward flange and/or a rearward flange.

In addition to one or more of the features described above, or as an alternative to any of the foregoing embodiments, the at least one axial hairpin feature is a first axial hairpin feature and a second axial hairpin feature and the first axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the first axial hairpin feature; and the second axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the second axial hairpin feature.

In addition to one or more of the features described above, or as an alternative to any of the foregoing embodiments, the first radially extending wall portion, the second radially extending wall portion and the axially extending portion of the first axial hairpin feature and the first radially extending wall portion, the second radially extending wall portion and the axially extending portion of the second axial hairpin feature are formed from a ductile metal.

In addition to one or more of the features described above, or as an alternative to any of the foregoing embodiments, the cavity of the first axial hairpin feature and the cavity of the second axial hairpin feature is filled with a potting material.

In addition to one or more of the features described above, or as an alternative to any of the foregoing embodiments, the second radially extending wall portion of the first axial hairpin feature is connected to the first radially extending wall portion of the second filled axial hairpin feature by the central connecting portion.

In addition to one or more of the features described above, or as an alternative to any of the foregoing embodiments, the at least one axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the at least one axial hairpin feature.

In addition to one or more of the features described above, or as an alternative to any of the foregoing embodiments, the first radially extending wall portion, the second radially extending wall portion and the axially extending portion of the at least one axial hairpin feature is formed from a ductile metal and the cavity of the at least one axial hairpin feature is filled with a potting material.

In addition to one or more of the features described above, or as an alternative to any of the foregoing embodiments, the central connecting portion varies radially as it extends from the at least one axial hairpin feature.

In addition to one or more of the features described above, or as an alternative to any of the foregoing embodiments, the first radially extending wall portion of the at least one axial hairpin feature is connected to either the forward flange or the rearward flange by a connecting portion which extends axially while the forward flange or the rearward flange extends radially therefrom.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
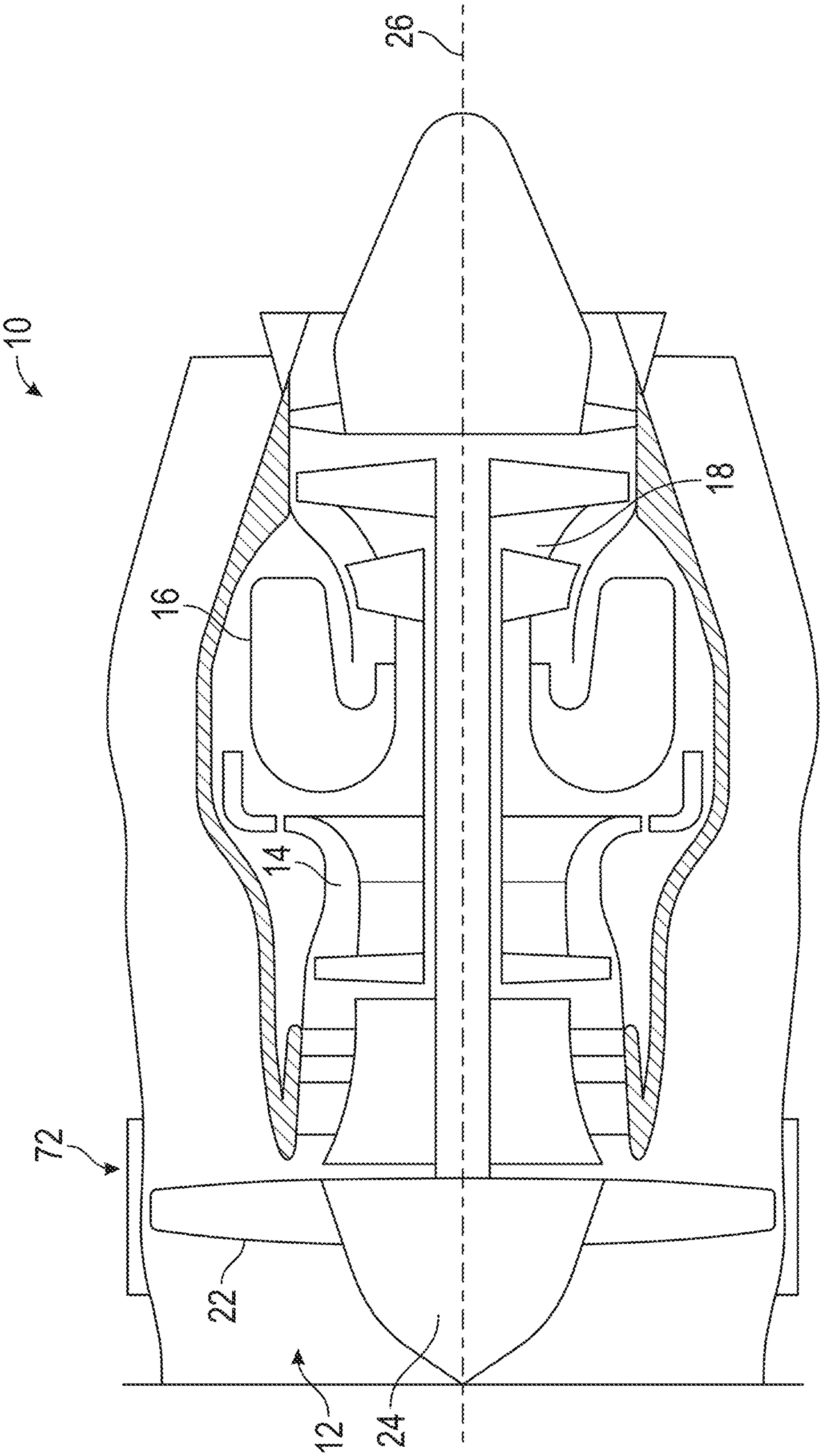
FIG. 1 is a schematic, partial cross-sectional view of a gas turbine engine in accordance with this disclosure.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 72 surrounding a circumferential array of fan blades 22 extending radially outwardly from a rotor 24 mounted for rotation about a central axis 26 of the engine 10.

It should be noted that the terms “radial”, “axial” and “circumferential” used throughout the description and the appended claims, are defined with respect to the central axis 26 of the engine 10. The terms “front”, “forward” “afore”, “aft” and after” used throughout the description and the appended claims are defined with respect to the flow direction of air being propelled through the engine.

In one non-limiting example, the fan 12 includes a plurality of fan blades 22. It is necessary to retain high energy debris resulting from a blade failure of any stage in the gas turbine engine 10 and this debris must be contained within the engine. In the case of a fan blade off, there are at least two dominant methods of achieving the containment of the fan blades 22. These may be referred to as hard wall and soft wall.

Hardwall containment relies upon a single ring of a strong material to contain the fan blade. This ring can be made of metal or composite, it may have ribs for stiffening specific areas, may have variable thickness or radius, and the fan case may include other layers (abradable and/or a blade tip blunting layer for example), but most of the energy is absorbed by the single containment ring. The advantage of hardwall containment is that it achieves containment reliably within a relatively small amount of space and with limited deflection, allowing the nacelle profile to be defined as tight as possible to the gas path to minimize powerplant drag. The disadvantages are that the forces generated in containment are very high, and are concentrated directly at the point of impact with limited redistribution around the ring, and the released blade remains in the gaspath, continuing to interact with the remaining blades, usually fracturing into multiple pieces, and travelling either upstream out the inlet or downstream out the exhaust and possibly interacting with structure along the way. The high, concentrated containment forces are transferred to the inlet, often driving heavier designs for inlet attachment flange and inlet structure. The blade remaining in the gaspath causes higher interaction forces with the following blade, sometimes driving increased blade weight to withstand these forces or in a few cases, causing multiple blades to release. The longer interaction also causes difficulties for trajectory predictions which are an important simulation validation point.

Soft wall containment relies on a multi-layered belt of dry Kevlar to contain the fan blade. The blade is allowed to pass through the structure of the fan cases (often a lightweight sandwich structure) and hit the Kevlar. The Kevlar belts slip and stretch significantly while absorbing the blade’s kinetic energy, causing a large bulge. The longer distance across which the blade travels during containment means that the peak force on the fan case is lower compared to hardwall containment, and the belt effectively redistributes the containment force around the circumference of the case. These effects together usually allow the fan case and adjacent structure to be lighter compared to hardwall containment. In addition, because the released blade exits the gaspath entirely, it only briefly interacts with the remaining fan blades, allowing further weight reduction. While prediction of the released blade trajectory is not trivial in soft wall containment, it is less chaotic than hardwall systems because following containment the blade is trapped between the case structure and the Kevlar belt. The disadvantages of soft wall containment are that the Kevlar bulge is significant, driving the nacelle loft outward, increasing drag. The bulge also causes the need for a keep out zone all around the fan case through which no crucial or hazardous hardware may pass, further complicating the design.

Figure 2:
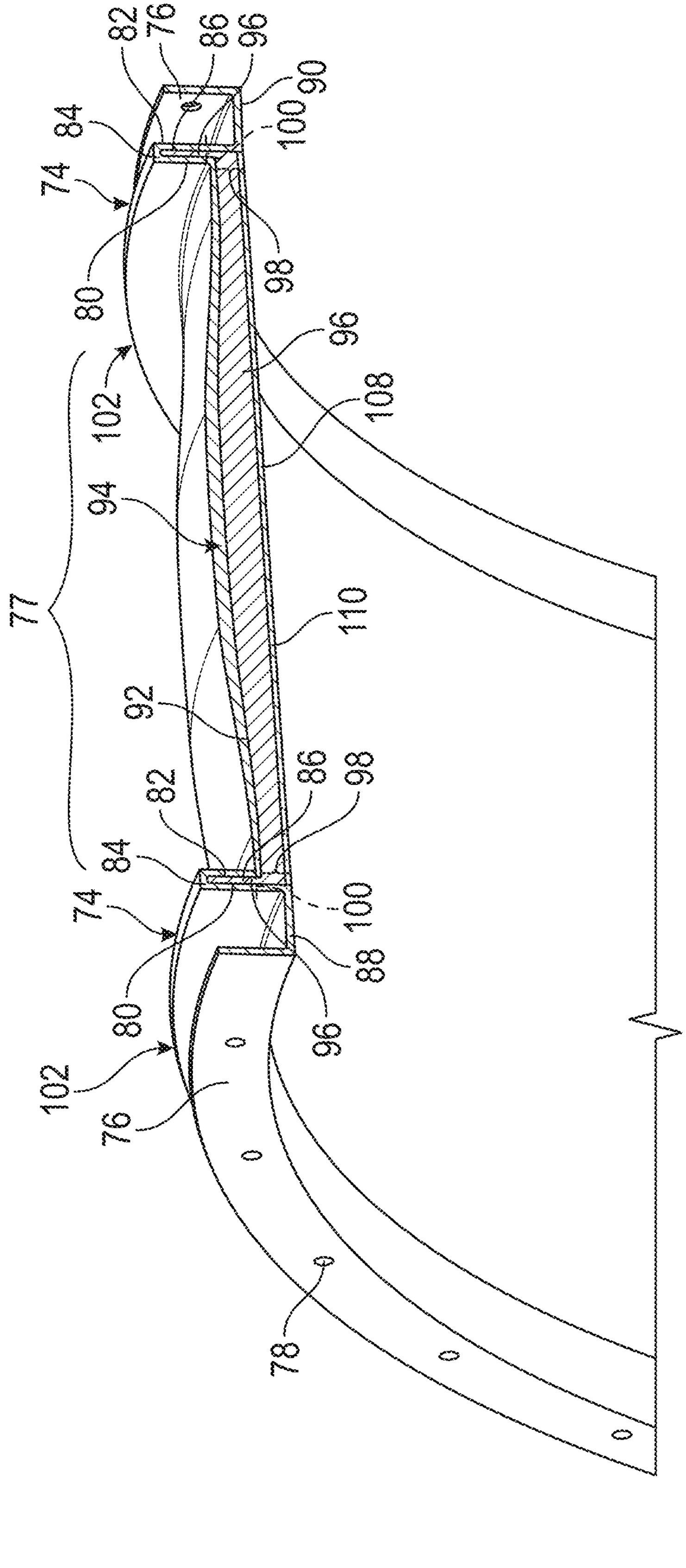
FIG. 2 is a partial perspective cross-sectional view fan case in accordance with the present disclosure.

FIG. 2 illustrates a portion of a casing 72 in accordance with the present disclosure. In one embodiment, the casing 72 is a fan casing 72 intended to retain fan blades 22 of the fan 12. It should be understood that while the casing 72 is illustrated as a fan casing the design of the casing 72 can be applied to other containment stages of the gas turbine engine (e.g., compressor section and turbine section).

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As used herein, "integral" or "integrally formed" is intended to cover a single unitary structure. In other words, the single unitary structure is not capable of being disassembled without cutting or destruction of the single unitary structure.

Figure 2A:
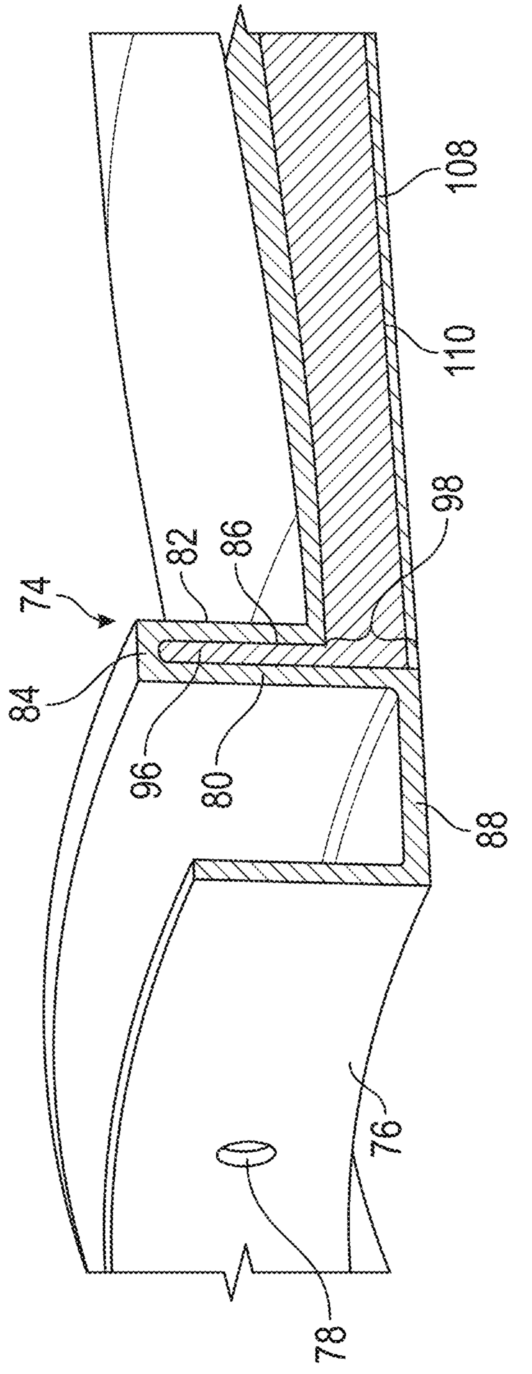
FIG. 2A is an enlarged view of a portion of FIG. 2.

As illustrated in at least FIGS. 2 and 2A, the casing 72 utilizes at least one axial hairpin feature 74 which may be referred to as a filled axial hairpin feature 74 or an axial hairpin feature 74 depending on its configuration. The axial hairpin feature 74 is configured to absorb energy in a hard wall containment design while isolating neighboring flanges 76 from large local deflections. For example, the at least one filled axial hairpin feature or axial hairpin feature 74 would be located between one of the flanges 76 and a containment zone or area 77. The containment zone or area 77 is intended to refer to an area with a dislodged or released blade will contact. In one non-limiting embodiment, the casing is provided with only one filled axial hairpin feature or axial hairpin feature 74, which may be located forward or aft of the containment zone or area 77 and between one of the flanges 76 and the containment zone or area 77.

In another embodiment and as illustrated, the casing includes two filled axial hairpin features or two axial hairpin features 74 namely, a first filled axial hairpin feature 74 or first axial hairpin feature 74 located proximate to a forward flange 76 and a second filled axial hairpin feature 74 or second axial hairpin feature 74 located proximate to a rearward flange 76. As used herein forward or upstream and rearward or downstream refer are relative to the engine central longitudinal axis 26 and the direction gases flowing through the gas turbine engine 10. In addition, radially inward and radially outward also refer to the engine central longitudinal axis 26. The flanges 76 may have openings 78 for bolts or fasteners (not shown) to pass therethrough in order to secure the casing 72 to engine 10. It should be understood that while the below description refers to two filled axial hairpin features or axial hairpin features 74 the same descriptions and embodiments are also intended to cover a casing having only a single filled axial hairpin feature or a single axial hairpin feature 74.

As illustrated in at least FIGS. 2 and 2A each filled axial hairpin feature or axial hairpin feature 74 includes a first radially extending wall portion 80 spaced from a second radially extending wall portion 82. Although, the wall portions 80 and 82 are referred to as radially extending it is understood that radially extending is intended to cover all configurations of radial extension (e.g., linear, orthogonal rounded, curved) unless otherwise noted and as long as some portion of the wall portions extends radially. The first radially extending wall portion 80 being forward with respect to the second radially extending wall portion 82. In addition, the first radially extending wall portion 80 and the second radially extending wall portion 82 are connected to each other at one end by an axially extending portion 84 while an opposite end of the first radially extending wall portion 80 and the second radially extending wall portion 82 are not connected to each other such that a cavity 86 is defined by the first radially extending wall portion 80, the second radially extending wall portion 82 and the axially extending portion 84.

The first radially extending wall portion 80 of the first filled axial hairpin feature or first axial hairpin feature 74 is connected to a first or forward flange 76 by a connecting portion 88 which extends axially while the first or forward flange 76 extends radially therefrom. The second radially extending wall portion 82 of the second filled axial hairpin feature or second axial hairpin feature 74 is connected to a second or rearward flange 76 by a connecting portion 90 which extends axially while the second or rearward flange 76 extends radially therefrom.

The second radially extending wall portion 82 of the first filled axial hairpin feature or first axial hairpin feature 74 is connected to the first radially extending wall portion 80 of the second filled axial hairpin feature or second axial hairpin feature 74 by a central connecting portion 92 which defines the containment zone or 77 and the central connecting portion 92 extends generally axially while the second radially extending wall portion 82 of the first filled axial hairpin feature or first axial hairpin feature 74 extends radially therefrom and the first radially extending wall portion 80 of the second filled axial hairpin feature or second axial hairpin feature 74 extends radially therefrom.

As illustrated, the central connecting portion 92 may vary radially as it extends between the first filled axial hairpin feature or first axial hairpin feature 74 and the second first filled axial hairpin feature or second axial hairpin feature 74. For example, a central portion 94 of the central connecting portion 92 may extend radially outward. Of course, various configurations of the central connecting portion 92 are considered to be within the scope of the present disclosure and the present disclosure is not intended to be limited to the specific configurations illustrated in the attached FIGS.

In one non-limiting embodiment, each cavity 86 of the first filled axial hairpin feature 74 and the second first filled axial hairpin feature 74 is filled with a lightweight bulk material 96, the lightweight bulk material may be anyone of a potting compound, a foam, a honeycomb or any combination thereof and the flanges 76, the first radially extending wall portions 80, the second radially extending wall portions 82, portions 84, connecting portion 88, connecting portion 90 and central connecting portion 92 are formed from a high ductile metal. In one non-limiting embodiment, the layer of honeycomb is NOMEX honeycomb or aluminum single or double flex honeycomb or corrugated aluminum. As used herein, NOMEX honeycomb refers to a honeycomb core formed from NOMEX paper sheets that are coated and bonded together with a phenolic resin. NOMEX paper may be defined as sheets formed from a synthetic aromatic polyamide polymer or a synthetic textile fiber or equivalents thereof. In one non-limiting embodiment, the foam may be aluminum or polymer open or closed cell foam. In one non-limiting embodiment, the flanges 76, the first radially extending wall portions 80, the second radially extending wall portions 82, portions 84, connecting portion 88, connecting portion 90 and central connecting portion 92 are formed from or into a single unitary structure. In one embodiment, at least or only the first radially extending wall portions 80, the second radially extending wall portions 82, portions 84, and central connecting portion 92 are formed from the high ductile metal. In one embodiment, at least or only the first radially extending wall portions 80, the second radially extending wall portions 82, portions 84, and central connecting portion 92 are formed from a single unitary structure.

In one non-limiting embodiment, the first radially extending wall portion 80 of the first filled axial hairpin feature or first axial hairpin feature 74 has a longer radial length than the second radially extending wall portion 82 of the first filled axial hairpin feature or first axial hairpin feature 74 such that an offset 98 is provided between the first radially extending wall portion 80 and the second radially extending wall portion 82 of the first filled axial hairpin feature or first axial hairpin feature 74. Similarly, the first radially extending wall portion 80 of the second filled axial hairpin feature or second axial hairpin feature 74 has a shorter radial length than the second radially extending wall portion 82 of the second filled axial hairpin feature or second axial hairpin feature 74 such that an offset 98 is provided between the first radially extending wall portion 80 and the second radially extending wall portion 82 of the second filled axial hairpin feature or second axial hairpin feature 74. Alternatively, the first radially extending wall portion 80 and the second radially extending wall portion 82 have a similar length in the radial direction such that no offset 98 is provided.

Figure 3:
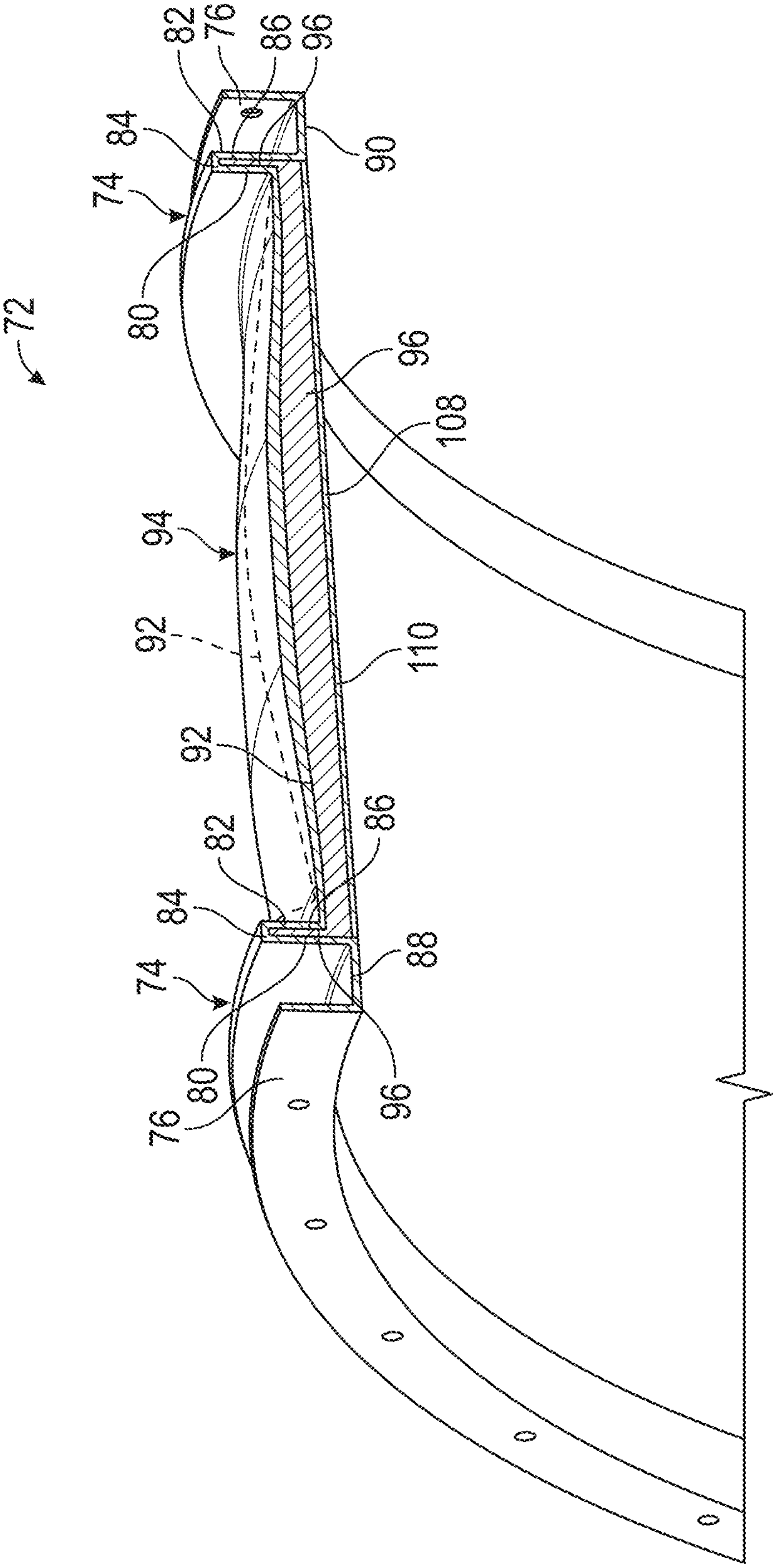
FIG. 3 is a partial perspective cross-sectional view fan case in an expanded state accordance with the present disclosure.

Referring now to FIG. 3, the dashed lines illustrate when the central connecting portion 92 defining the containment zone or area 77 has been contacted by a blade 22 that has been dislodged from the fan 12. As such, when the blade 22 has contacted the connecting portion 92 the connecting portion has been displaced radially outward and the second radially extending wall portion 82 of the first filled axial hairpin feature or first axial hairpin feature 74 is displaced from the first radially extending wall portion 80 and the first radially extending wall portion 80 of the second filled axial hairpin feature or second axial hairpin feature 74 is displaced from the second radially extending wall portion 82 of the second filled axial hairpin feature or second axial hairpin feature 74. It is noted that the dashed lines are merely a non-limiting example of the displacement of the casing 72 after it has been impacted by a dislodged blade.

The filled nature of the first filled axial hairpin feature 74 and the second filled axial hairpin feature 74 eliminates possible dynamics concerns by allowing the structure to have a stiffness within the typical hard wall case range during normal operation. Under fan blade off (FBO), the hairpin features 74 open easily and allows an intermediate level of containment bulge, which reduces the peak containment forces without requiring a dramatically larger keep out zone or nacelle loft. At the same time, the hairpin feature's opening redistributes the forces acting on the adjacent flange 76, allowing a lighter weight, more compact design for the flange, fasteners and adjacent structure, and allowing the flanges to be located closer to the containment zone compared to conventional hard wall designs.

The hairpin feature geometry can vary, and may or may not include the aforementioned radial offsets 98 between adjacent surfaces, and could be of variable thickness material depending on the containment energies and geometries involved.

In an alternative embodiment, the first radially extending wall portion 80 and the second radially extending wall portion 82 of the filled axial hairpin features or axial hairpin features 74 are held closed with weak fasteners or frangible fasteners 100 intended to break during a fan blade off (FBO) but hold the hairpin features 74 closed during normal operation. As the fasteners 100 break during fan blade off (FBO) some energy would be absorbed.

As mentioned above, the hairpin features 74 may be filled with a lightweight bulk material 96 such as a potting compound and/or a honeycomb or alternatively a foam, or any other material and combinations thereof. Some materials 96 such as a damped elastomer or crushed metal foam could be used to control the damping characteristics of the case 72.

In one embodiment an inner radial surface 108 of the lightweight bulk material 96 is provided with an inner ring portion or gas path skin 110, which may be formed with a recessed area (not shown) for receipt of an abradable surface or layer such as a composite potting material. The abradable surface being aligned with rotating blades 22 of the fan 12. The recessed area and the abradable surface or layer are located on a radially inner surface of the inner ring portion or gas path skin 110. Of course, embodiments of the present disclosure contemplate an inner ring portion or gas path skin 110 without the recessed area and abradable surface or layer. The inner ring portion or gas path skin 110 may also be configured to have perforations for acoustic purposes.

In one non-limiting embodiment, the hairpin features 74 may comprise a welded assembly, which would allow the hairpin 74 to have no gap between the adjacent faces of the first radially extending wall portion 80 and the second radially extending wall portion 82 thus requiring no filling. The weld would be intended to break when it is subjected to high strains during a fan blade off (FBO). The breaking of strategically placed welds could also provide additional energy absorption during the fan blade off. In this embodiment the axial hairpin feature 74 are referred to as axial hairpin features 74 as opposed to filled axial hairpin features 74.

In one non-limiting embodiment, the hard wall portion of the case 72 could be made of reinforced composite such as carbon, glass, or aramid fiber reinforced epoxy or equivalents thereof as opposed to sheet metal or metal. This would require a composite capable of undergoing significant bending at a tip 102 of the hairpin features without breaking.

In an alternative embodiment, the containment zone or area 77 of the central connecting portion 92 could be lobed instead of axisymmetric so that the total length of the connecting portion 92 is greater than the circumference. This would allow increased flexibility in the hoop direction in addition to the axial flexibility provided by the hairpins 74, which would in turn reduce the peak containment forces by absorbing the kinetic energy across a larger displacement.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing for a gas turbine engine, comprising:

an outer casing, the outer casing formed with at least one axial hairpin feature, the at least one axial hairpin feature located proximate to either a forward flange or a rearward flange of the outer casing, the at least one axial hairpin feature defining a cavity that is filled with a lightweight bulk material; and a central connecting portion extending from the at least one axial hairpin feature, the at least one axial hairpin feature being located between the central connecting portion and one of the forward flange or a rearward flange, wherein the at least one axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that the cavity is defined by the first radially extending wall portion, the second radially extending wall portion and the axially extending portion of the at least one axial hairpin feature and the at least one axial hairpin feature is configured such that the second radially extending wall portion can deflect away from the first radially extending wall portion in order to redistribute forces acting on the forward flange and/or the rearward flange.

2. The casing as in claim 1, wherein the first radially extending wall portion is longer than the second radially extending wall portion such that an offset is provided between the first radially extending wall portion and the second radially extending wall portion.

3. The casing as in claim 1, wherein the first radially extending wall portion, the second radially extending wall portion and the axially extending portion of the at least one axial hairpin feature are formed from a ductile metal.

4. The casing as in claim 3, wherein the lightweight bulk material is one of a potting material, foam or honeycomb.

5. The casing as in claim 1, wherein the at least one axial hairpin feature is a first axial hairpin feature and the outer casing further comprises a second axial hairpin feature, and the second axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the second axial hairpin feature, the cavity defined by the first radially extending wall portion, the second radially extending wall portion and the axially extending portion of the second axial hairpin feature cavity is filled with a lightweight bulk material and the second radially extending wall portion of the first axial hairpin feature is connected to the first radially extending wall portion of the second axial hairpin feature by the central connecting portion and the second axial hairpin feature is configured such that the first radially extending wall portion of the second axial hairpin feature can deflect away from the second radially extending wall portion of the second axial hairpin feature in order to redistribute forces acting on the forward flange and/or the rearward flange.

6. The casing as in claim 5, wherein the lightweight bulk material is one of a potting material, foam or honeycomb.

7. The casing as in claim 6, wherein the lightweight bulk material extends along the connecting portion.

8. The casing as in claim 1, wherein the central connecting portion varies radially as it extends from the at least one axial hairpin feature.

9. The casing as in claim 1, wherein the first radially extending wall portion of the at least one axial hairpin feature is connected to either the forward flange or the rearward flange by a connecting portion which extends axially while the forward flange or the rearward flange extends radially therefrom.

10. The casing as in claim 1, wherein the casing is a fan casing.

11. A casing for a gas turbine engine, comprising:

an outer casing, the outer casing formed with at least one axial hairpin feature, the at least one axial hairpin feature located proximate to either a forward flange or a rearward flange of the outer casing, the at least one axial hairpin feature includes a first radially extending wall portion and a second radially extending wall portion, the first radially extending wall portion and the second radially extending wall portion are connected to each other at one end while an opposite end of the first radially extending wall portion and the second radially extending wall portion are not connected to each other, the first radially extending wall portion and the second radially extending wall portion of the at least one axial hairpin feature are secured together by frangible fasteners; and a central connecting portion extending from the at least one axial hairpin feature, the at least one axial hairpin feature being located between the central connecting portion and one of the forward flange or a rearward flange and the at least one axial hairpin feature is configured such that the second radially extending wall portion can deflect away from the first radially extending wall portion in order to redistribute forces acting on the forward flange and/or the rearward flange.

12. A gas turbine engine, comprising:

a fan having a plurality of fan blades;

a casing surrounding the plurality of fan blades, the casing comprising:

an outer casing, the outer casing formed with at least one axial hairpin feature, the at least one axial hairpin feature located proximate to either a forward flange or a rearward flange of the outer casing, the at least one axial hairpin feature defining a cavity that is filled with a lightweight bulk material; and a central connecting portion extending from the at least one axial hairpin feature, the at least one axial hairpin feature being located between the central connecting portion and one of the forward flange and/or the rearward flange, wherein the at least one axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that the cavity is defined by the first radially extending wall portion, the second radially extending wall portion and the axially extending portion of the at least one axial hairpin feature and the at least one axial hairpin feature is configured such that the second radially extending wall portion can deflect away from the first radially extending wall portion in order to redistribute forces acting on the forward flange and/or the rearward flange.

13. The gas turbine engine as in claim 12, wherein the at least one axial hairpin feature is a first axial hairpin feature and the outer casing further comprises a second axial hairpin feature, and the second axial hairpin feature includes a first radially extending wall portion spaced from a second radially extending wall portion, the first radially extending wall portion and the second radially extending wall portion are connected to each other at one end by an axially extending portion while an opposite end of the first radially extending wall portion and the second radially extending wall portion are not connected to each other such that a cavity is defined by the first radially extending wall portion, the second radially extending wall portion and the axially extending portion of the second axial hairpin feature, the cavity defined by the first radially extending wall portion, the second radially extending wall portion and the axially extending portion of the second axial hairpin feature is filled with a lightweight bulk material and the second axial hairpin feature is configured such that the first radially extending wall portion of the second axial hairpin feature can deflect away from the second radially extending wall portion of the second axial hairpin feature in order to redistribute forces acting on the forward flange and/or the rearward flange.

14. The gas turbine engine as in claim 13, wherein the first radially extending wall portion, the second radially extending wall portion and the axially extending portion of the first axial hairpin feature and the first radially extending wall portion, the second radially extending wall portion and the axially extending portion of the second axial hairpin feature are formed from a ductile metal.

15. The gas turbine engine as in claim 13, wherein the lightweight bulk material is one of a potting material, foam or honeycomb.

16. The gas turbine engine as in claim 13, wherein the second radially extending wall portion of the first axial hairpin feature is connected to the first radially extending wall portion of the second axial hairpin feature by the central connecting portion.

17. The gas turbine engine as in claim 12, wherein the first radially extending wall portion is longer than the second radially extending wall portion such that an offset is provided between the first radially extending wall portion and the second radially extending wall portion.

18. The gas turbine engine as in claim 12, wherein the first radially extending wall portion, the second radially extending wall portion and the axially extending portion of the at least one axial hairpin feature is formed from a ductile metal and the lightweight bulk material is one of a potting material, foam or honeycomb.

19. The gas turbine engine as in claim 12, wherein the central connecting portion varies radially as it extends from the at least one axial hairpin feature.

20. The gas turbine engine as in claim 12, wherein the first radially extending wall portion of the at least one axial hairpin feature is connected to either the forward flange or the rearward flange by a connecting portion which extends axially while the forward flange or the rearward flange extends radially therefrom.

* * * * *